United States Patent
Nakamura et al.

(10) Patent No.: US 9,891,499 B2
(45) Date of Patent: Feb. 13, 2018

(54) ACOUSTO-OPTIC MODULATOR

(71) Applicant: KABUSHIKI KAISHA TOSHIBA, Minato-ku (JP)

(72) Inventors: Satoshi Nakamura, Tokyo (JP); Hayato Goto, Kawasaki (JP); Mamiko Kujiraoka, Kawasaki (JP); Kouichi Ichimura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/225,436

(22) Filed: Aug. 1, 2016

(65) Prior Publication Data
US 2016/0342066 A1 Nov. 24, 2016

Related U.S. Application Data
(63) Continuation of application No. 13/563,899, filed on Aug. 1, 2012, now Pat. No. 9,436,061.

(30) Foreign Application Priority Data

Sep. 21, 2011 (JP) .................. 2011-206336

(51) Int. Cl.
*G02F 1/11* (2006.01)
*G02F 1/33* (2006.01)

(52) U.S. Cl.
CPC .................. *G02F 1/33* (2013.01); *G02F 1/11* (2013.01); *G02F 2201/56* (2013.01)

(58) Field of Classification Search
USPC ....... 359/237, 238, 275, 278, 279, 286, 287, 359/290, 291, 292, 298
See application file for complete search history.

(56) References Cited

U.S. PATENT DOCUMENTS 4,759,613 A 7/1988 Fox
5,058,091 A 10/1991 Murao et al.
(Continued)

FOREIGN PATENT DOCUMENTS

JP S49-81043 8/1974
JP S51-119242 10/1976
(Continued)

OTHER PUBLICATIONS

Japanese Office Action dated Aug. 18, 2015, in Patent Application No. 2014-177318 with English translation.
(Continued)

*Primary Examiner* — Brandi Thomas
(74) *Attorney, Agent, or Firm* — Oblon, McClelland, Maier & Neustadt, L.L.P.

(57) ABSTRACT

According to one embodiment, an acousto-optic modulator includes an acousto-optic medium and a piezoelectric transducer. The acousto-optic medium has a configuration of a hexahedron. The acousto-optic medium has surfaces D, E, F, G and H. The piezoelectric transducer is provided on a surface C of the acousto-optic medium. The surface D opposes the surface C and has respective four sides shared by the surfaces E, F, G and H. Four angles defined between the surface D and the surfaces E, F G and H each is other than 90°. At least one of eight angles defined between each pair of the surfaces C, E, F, G and H is other than 90°. The each pair has one shared side.

10 Claims, 5 Drawing Sheets

(56) References Cited

U.S. PATENT DOCUMENTS

| | | | |
|---|---|---|---|
| 5,981,903 A | 11/1999 | Baumgart et al. | |
| 7,054,055 B2 | 5/2006 | Shibuya et al. | |
| 7,133,533 B2 | 11/2006 | Chick et al. | |
| 2007/0171513 A1* | 7/2007 | Pannell | H01S 3/117 |
| | | | 359/305 |

FOREIGN PATENT DOCUMENTS

| | | |
|---|---|---|
| JP | S58-129425 | 8/1983 |
| JP | S60-136719 | 7/1985 |
| JP | S62-050729 | 3/1987 |
| JP | H3-144418 | 6/1991 |
| JP | H3-160413 | 7/1991 |
| JP | H3-168719 | 7/1991 |
| JP | H10-275341 | 10/1998 |
| JP | 2002-76509 | 3/2002 |
| JP | 2005-017343 | 1/2005 |

OTHER PUBLICATIONS

Japanese Office Action for Japanese Patent Application No. 2011-206336 dated Jul. 1, 2014.
Japanese Office Action for Japanese Patent Application No. 2011-206336 dated Feb. 3, 2015.

* cited by examiner

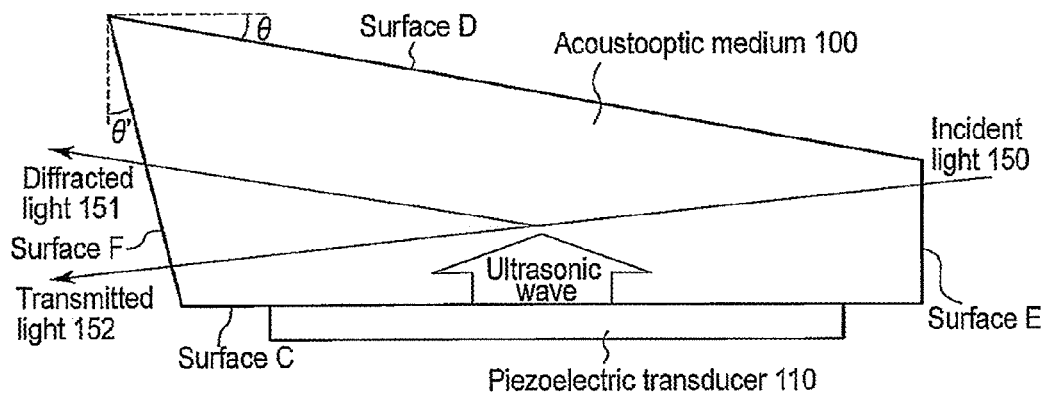
F I G. 3
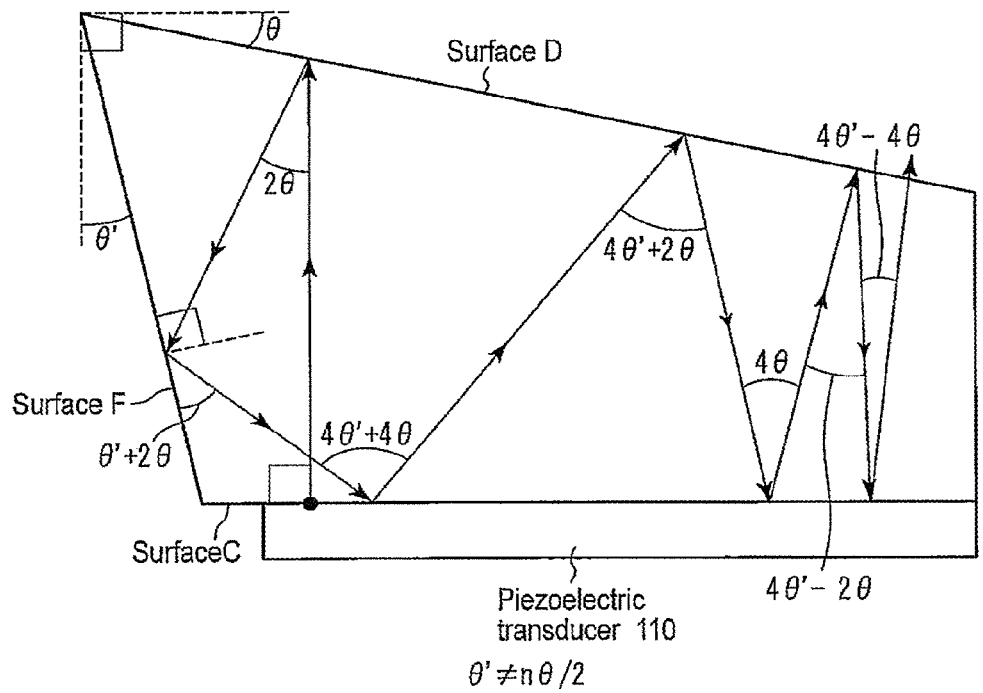
F I G. 4

ACOUSTO-OPTIC MODULATOR

CROSS-REFERENCE TO RELATED APPLICATIONS

This application is a continuation of U.S. application Ser. No. 13/563,899, filed Aug. 1, 2012, and is based upon and claims the benefit of priority from Japanese Patent Application No. 2011-206336, filed Sep. 21, 2011, the entire contents of each of which are incorporated herein by reference.

FIELD

Embodiments described herein relate to acousto-optic modulators capable of perform accurate optical modulation.

BACKGROUND

To realize accuracy and stability of optical modulation, it is important to stabilize the luminous intensity of the traveling wave generated. However, it is known that since in general, an acousto-optic medium significantly differs in acoustic impedance from air, ultrasonic waves reflect on the boundary surface of the acousto-optic medium to degrade the stability of ultrasonic wave travelling in crystal. There is a conventional technique developed to avoid the degradation. In this technique, the surface of the acousto-optic medium opposed to a surface of a piezoelectric transducer and the surface of the piezoelectric transducer are not parallel thereto to prevent direct reflection, and an ultrasonic wave absorbing material is employed to absorb ultrasonic waves.

However, such an absorbing material does not exist that has an acoustic impedance completely equal to that of the acousto-optic medium, can achieve sufficient ultrasonic wave attenuation, and can be easily installed and produced at low cost. Accordingly, in the conventional acousto-optic modulators, certain ultrasonic reflection waves exist, which may cause various types of degradation of modulation accuracy.

BRIEF DESCRIPTION OF THE DRAWINGS

FIG. 3 is a view illustrating the acousto-optic medium of FIG. 2 seen from a direction perpendicular to surface H in FIG. 2;

FIG. 4 is a view illustrating an ultrasonic wave reflection mode employed in the acousto-optic medium of FIG. 2;

DETAILED DESCRIPTION

Figure 1:
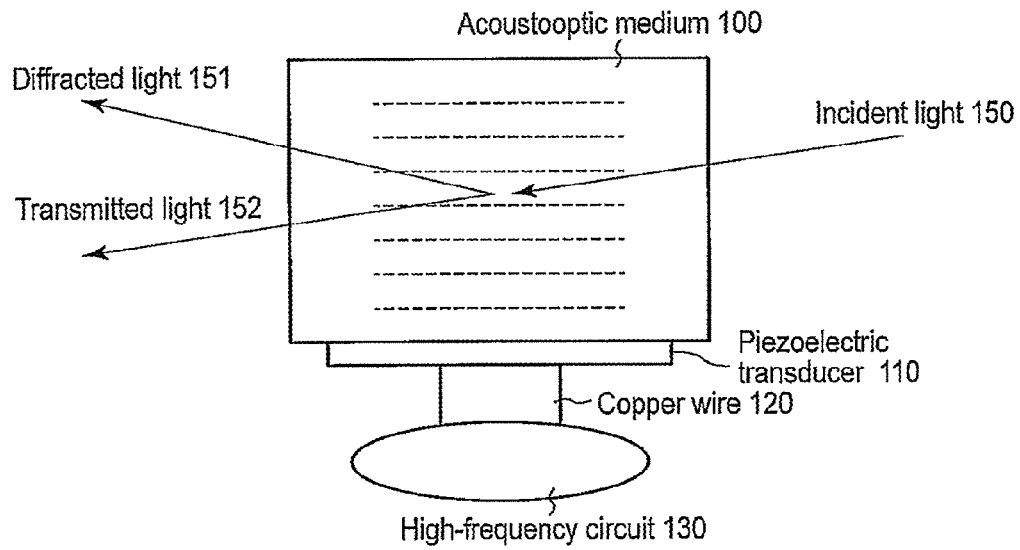
FIG. 1 is a view illustrating an acousto-optic modulator according to an embodiment.

An acousto-optic modulator according to an embodiment will be described in detail with reference to the accompanying drawings. In the embodiment and examples thereof, like reference numbers denote like elements, and no duplicate descriptions will be given of the elements.

The embodiment has been developed in view of the above-mentioned problem, and aims to provide an acousto-optic modulator that achieves enhancement of stability in the intensity of light generated during frequency modulation.

According to one embodiment, an acousto-optic modulator includes an acousto-optic medium and a piezoelectric transducer. The acousto-optic medium has a• configuration of a hexahedron. The acousto-optic medium has surfaces D, E, F, G and H. The piezoelectric transducer is provided on a surface C of the acousto-optic medium. The surface D opposes the surface C and has respective four sides shared by the surfaces E, F, G and H. Four angles defined between the surface D and the surfaces E, F, G and H each is other than 90°. At least one of eight angles defined between each pair of the surfaces C, E, F, G and H is other than 90°. The each pair has one shared side.

The acousto-optic modulator is used as an apparatus for modulating the frequency, intensity and direction of light. In general, the acousto-optic modulator comprises an acousto-optic medium 100, a piezoelectric transducer 110, and a high-frequency circuit 130, and is widely used as an optical modulator. Alternatively, an apparatus that comprises the acousto-optic medium 100 and the piezoelectric transducer 110, and does not comprise high-frequency circuit 130 may be called an acousto-optic modulator.

The acousto-optic medium 100 is a medium that propagates ultrasonic waves and light, and is forthed of single crystal or glass, for example, single crystal of tellurium dioxide or lead molybdate, or glass containing tellurium dioxide or lead molybdate.

The piezoelectric transducer 110 is adhered to the acousto-optic medium 100 and is connected to the high-frequency circuit 130 via metal wires (e.g., copper wires 120).

The operation principle of the acousto-optic modulator will now be described.

The high-frequency circuit 130 outputs a high-frequency signal to the piezoelectric transducer 110, where the signal is converted into ultrasonic waves. The thus-generated ultrasonic waves serve as the traveling wave and enter the acousto-optic medium 100 to thereby form a pattern of condensation and rarefaction. The pattern serves as a diffraction grating for incident light, and the diffracted light is modulated in accordance with the frequency and intensity of the ultrasonic waves. This diffraction phenomenon is called an acousto-optic effect.

In the conventional acousto-optic modulators, there is a mode in which the ultrasonic wave emitted by the piezoelectric transducer is reflected several times by a plurality of surfaces of the acousto-optic medium 100, perpendicularly enters a plane on which the piezoelectric transducer is provided, and interferes another ultrasonic wave newly emitted by the piezoelectric transducer. This mode is equivalent to a state in which the acousto-optic medium serves as a Fabry-Perot cavity for ultrasonic waves. In the conventional acousto-optic modulators, a plurality of reflection modes occur in accordance with the times of reflection of an ultrasonic wave on a plane opposing the plane with the piezoelectric transducer provided thereon. In accordance with the reflection modes, a noise pattern of the intensity occurs, in which repetitive noise occurs for each of certain frequencies. The noise pattern of the intensity becomes an important problem when accurate optical frequency modulation is performed, and there is a demand for improving the same.

In view of the above, the acousto-optic modulator of the embodiment is designed to a configuration that is free from the above-mentioned modes. If the acousto-optic modulator is of a hexahedron, its configuration is set so that the surface thereof, to which the piezoelectric transducer 110 is attached, does not permit light to perpendicularly enter it. If the acousto-optic modulator is of a heptahedron or octahedron, etc., other than the hexahedron, this is more advantageous in preventing light from entering the surface of the element at right angles with respect thereto, to which surface the piezoelectric transducer 110 is adhered.

Figure 2:
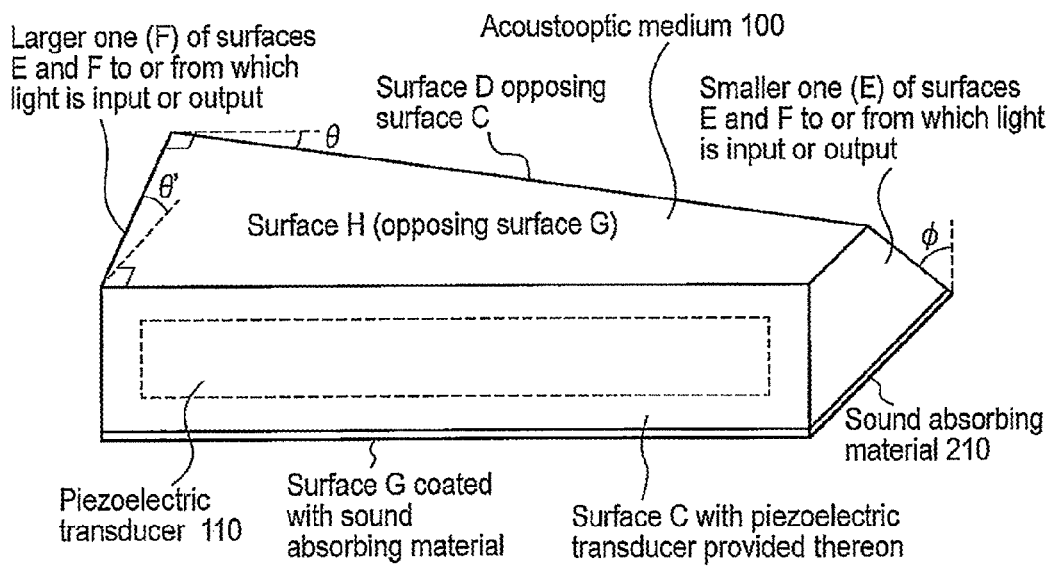
FIG. 2 is a view illustrating the configuration of an acousto-optic medium according to the embodiment and a first example.

Referring then to FIGS. 2 and 3, the acousto-optic modulator of the embodiment will be described specifically. The acousto-optic modulator of the embodiment has a configuration that has a function of suppressing the noise pattern of the intensity occurring during frequency modulation.

As described above, the acousto-optic modulator of the embodiment comprises the acousto-optic medium 100, the piezoelectric transducer 110, and a sound absorbing material 210. The sound absorbing material 210 is, however, not indispensable.

As shown in FIG. 2, the surface on which the piezoelectric transducer 110 is provided is defined as a surface C, the surface opposing the surface C is defined as a surface D, one of the light input and output surfaces that has a smaller area than the other is defined as a surface E, the other surface having a larger area is defined as a surface F, the surface other than the above-mentioned surfaces and covering the sound absorbing material 210 is defined as a surface G, and the surface opposing the surface G is defined as a surface H. In the embodiment, the four angles formed between the surface D opposing the surface C and the four surfaces E, F, G and H (each of which shares its one side with the corresponding one of the four sides of the surface D) are set to values other than 90°. Further, at least one of the eight angles formed between each pair of the surfaces C, E, F, G and H (the each pair having one shared side) is set to a value other than 90°.

In the acousto-optic modulator of the embodiment, the angle defined between the surfaces F and C is set to a value other than 90°, as shown in FIG. 2. Further, the angle defined between the surfaces F and C is set to $0'+n\theta/2$, and the angle defined between the surfaces C and D is set to $\theta$. FIG. 3 is a view seen from above the surface H in a direction perpendicular to the surface H, and in this structure, the angle defined between the surfaces F and C is set greater than 90°. Further, unless $0'=n\theta/2$ (n is an integer not lower than 1), a mode in which an ultrasonic wave enters the surface C at right angles with respect thereto does not exist. In other words, a condition that the mode in which the ultrasonic wave enters the surface C at right angles does not exist means that no matter how many times the ultrasonic wave enters the surface C, it does not enter the surface C at right angles. This condition is a condition for preventing a cavity mode (in which reflection of the same trajectory is iterated). Since ultrasonic waves are output from the surface C at right angles with respect thereto, such a mode as in which the ultrasonic waves pass the same trajectory does not exist unless they again enter the surface C at right angles.

The above condition can be derived based on the fact that the incident angle with respect to the surface C is not 90° as shown in FIG. 4. Further, even if $0'=n\theta/2$ is satisfied, the number of times of reflection of an ultrasonic wave in the acousto-optic medium is greater than in the case where $0'=0$, and therefore interference is weakened by the ultrasonic wave absorption of the sound absorbing material attached to the acousto-optic medium or by attenuation of the ultrasonic wave in the crystal, thereby suppressing the noise level.

Figure 5:
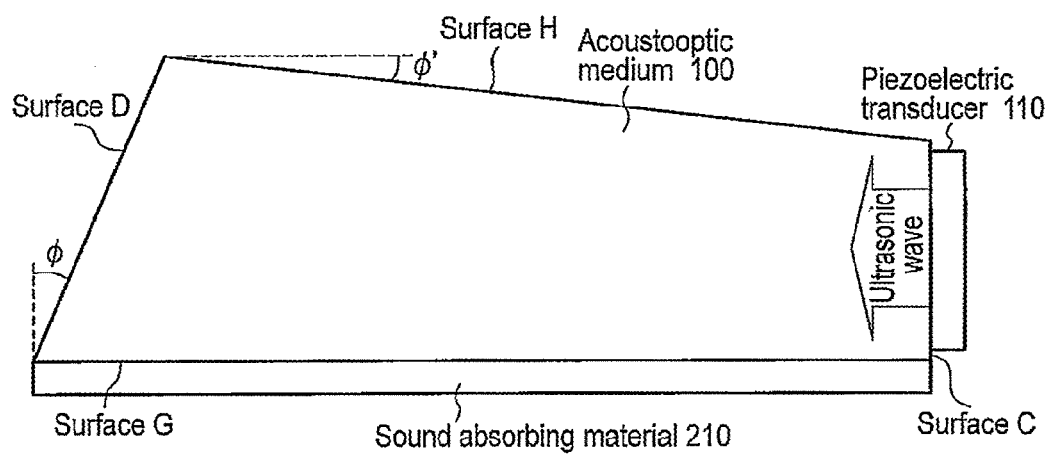
FIG. 5 is a view illustrating the configuration of an acousto-optic medium according to a second example.
Figure 9:
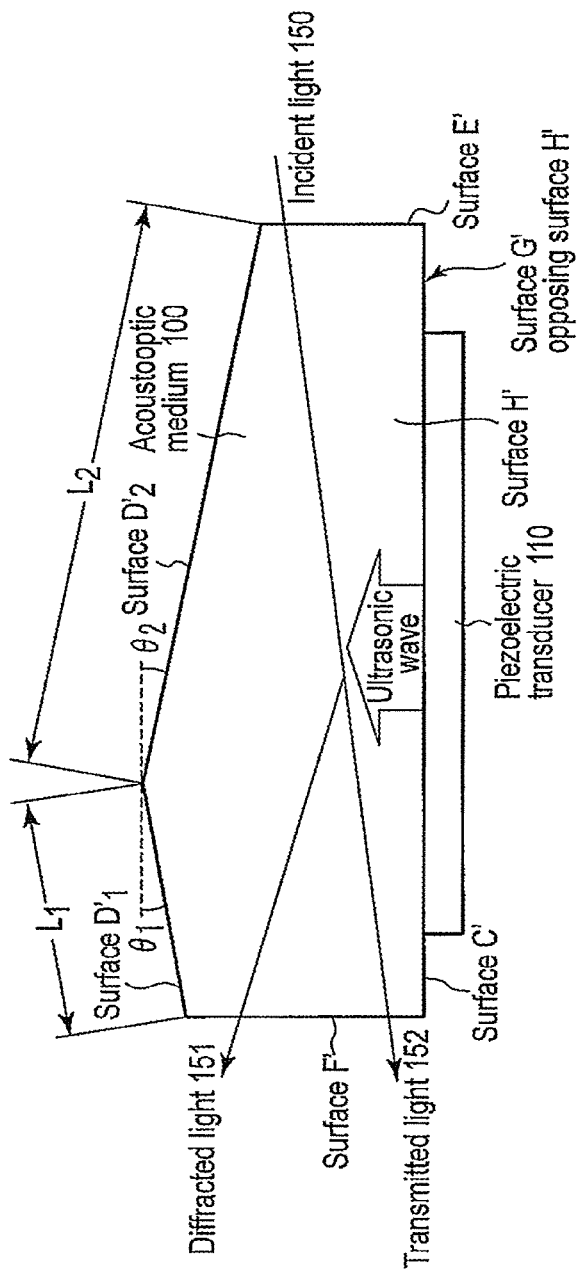
FIG. 9 is a view illustrating the configuration of an acousto-optic medium according to a fourth example.

The same effect as resulting from the configuration of FIG. 2 can be obtained by setting the angle of the surface H with respect to the surface C to a value other than 90°, as is shown in FIG. 5 (see a second example described later), or by setting, to a value other than 90° with respect to the other surfaces, the angle of the surface C itself on which the piezoelectric transducer is placed (see a third example described later). Furthermore, the interference mode can be varied even by dividing the surface D into two or more surfaces as shown in FIG. 9 (see a fourth example), as well as by making the surface D be a non-parallel surface. Also in this case, the interference modes are changed to eliminate the ultrasonic wave interference mode. In addition, by attaching the sound absorbing material to a particular portion to suppress only a particular interference mode in a focused manner, the amount of the sound absorbing material necessary for efficient interference mode suppression can be reduced.

In the above-described acousto-optic modulator of the embodiment, since the surfaces of the acousto-optic medium are formed nonparallel to each other to suppress the ultrasonic wave interference mode, the stability of intensity of the light generated during frequency modulation by the acousto-optic modulator can be remarkably enhanced without using an expensive sound absorbing material.

EXAMPLES

Four examples will now be described.

First Example

As shown in FIG. 1, a piezoelectric transducer 110 is attached to an acousto-optic medium 100 formed of crystal of tellurium dioxide, and a high-frequency circuit 130 is attached to the piezoelectric transducer 110 by copper wires 120. At this time, the acousto-optic medium 100 is processed into the configuration shown in FIG. 2, with $\theta=8°$, $=20°$ and $0'=23°$. Further, the surface G of the acousto-optic medium 100 is coated with a sound absorbing material 210, such as silver paste, as is shown in FIG. 2.

The high-frequency circuit 130 applies a high-frequency signal for frequency modulation to the acousto-optic transducer 110 via the copper wires 120. When incident light 150 is input to the acousto-optic modulator with a Bragg angle, diffracted light 151 and transmitted light 152 are emitted from the modulator. The diffracted light 151 is the frequency-modulated light of the incident light 150. The intensity stability of the diffracted light 151 is significantly higher than in the case of $0'=0°$.

Second Example

As shown in FIG. 1, a piezoelectric transducer 110 is attached to an acousto-optic medium 100 formed of tellurium dioxide crystal, and a high-frequency circuit 130 is attached to the piezoelectric transducer 110 by copper wires 120. At this time, the acousto-optic medium 100 is processed into the configuration shown in FIG. 5, with (I)=20° and V=15°. Further, the surface G of the acousto-optic medium 100 is coated with a sound absorbing material 210, such as silver paste, as is shown in FIG. 5. The high-frequency circuit 130 applies a high-frequency signal for frequency modulation to the acousto-optic transducer 110 via the copper wires 120. When incident light 150 is input to the acousto-optic modulator with a Bragg angle, diffracted light 151 and transmitted light 152 are emitted from the modulator. The diffracted light 151 is the frequency-modulated light of the incident light 150.

Figure 6:
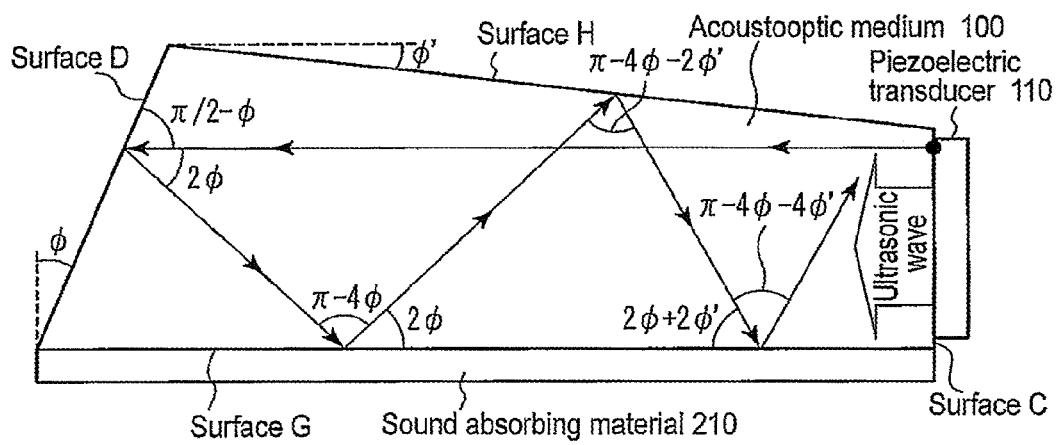
FIG. 6 is a view illustrating an ultrasonic wave reflection mode employed in the acousto-optic medium of FIG. 5.

When the angle defined between the surface H opposing the surface G and the surface C is set to n/2−1−4)' and the angle defined between the surface G and the surface D is set to n/2-$ as shown FIG. 6, if a mode in which light perpendicularly enters the surface C does not exist, n4)'0 7c/2−2(0. In contrast, in the case of 4'0 n/2−4, the above-mentioned interference mode is suppressed, and the intensity stability of the diffracted light 151 is significantly higher than in the case of (1)'=0°.

Third Example

Figure 7:
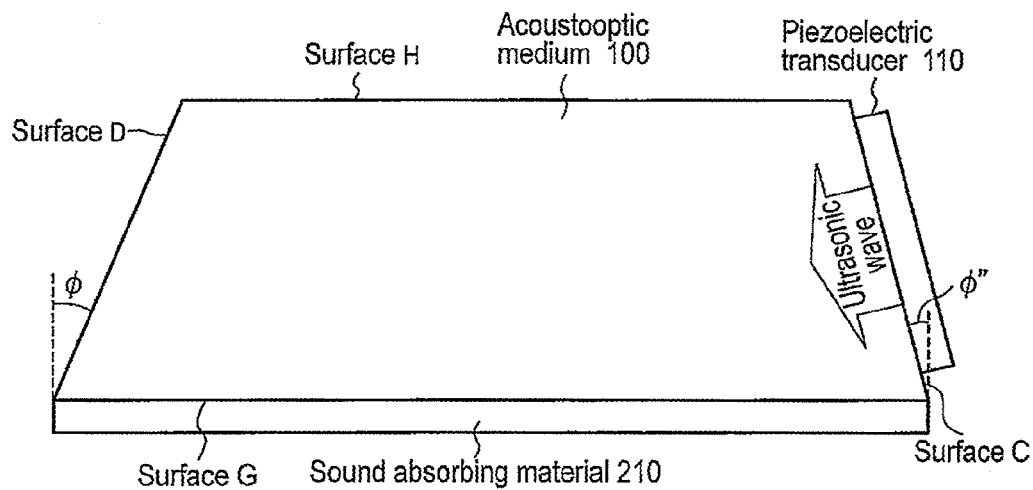
FIG. 7 is a view illustrating the configuration of an acousto-optic medium according to a third example.

As shown in FIG. 1, a piezoelectric transducer 110 is attached to an acousto-optic medium 100 formed of tellurium dioxide crystal, and a high-frequency circuit 130 is attached to the piezoelectric transducer 110 by copper wires 120. At this time, the acousto-optic medium 100 is processed into the configuration shown in FIG. 7, with A1)=20° and e=35'. Further, the surface G of the acousto-optic medium 100 is coated with a sound absorbing material 210, such as silver paste, as is shown in FIG. 7. The high-frequency circuit 130 applies a high-frequency signal for frequency' modulation to the acousto-optic transducer 110 via the copper wires 120. When incident light 150 is input to the acousto-optic modulator with a Bragg angle, diffracted light 151 and transmitted light 152 are emitted from the modulator. The diffracted light 151 is the frequency-modulated light of the incident light 150.

Figure 8:
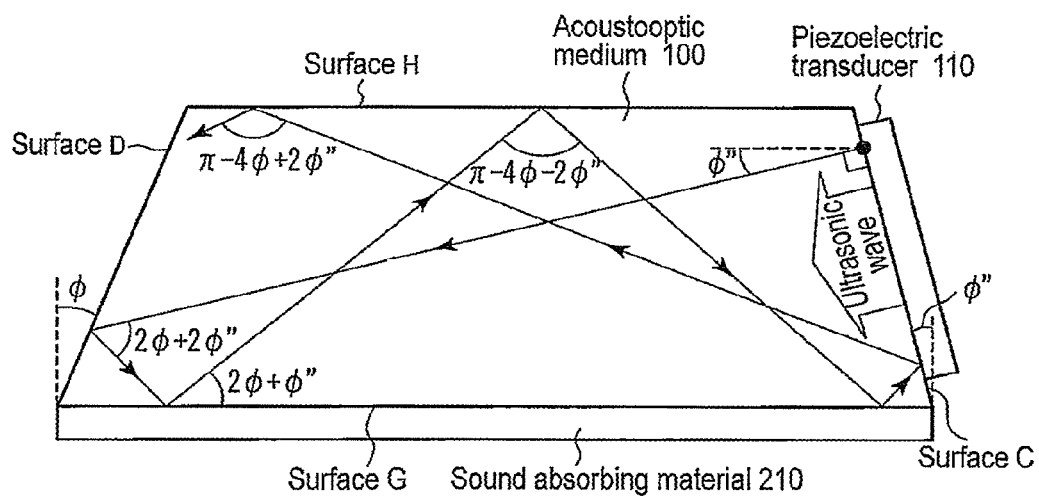
FIG. 8 is a view illustrating an ultrasonic wave reflection mode employed in the acousto-optic medium of FIG. 7.

When the angle defined between the surface G and the surface C is set to n/2−+" and the angle defined between the surface G and the surface D is set to 7c/2−4) as shown FIG. 8, if a mode in which light perpendicularly enters the surface C does not exist, ne 0 In/2−2+1 and e −4. In contrast, in the case of ne 0 17c/2−41 and 4# -qa, the above-mentioned interference mode is suppressed, and the intensity stability of the diffracted light 151 is significantly higher than in the case of 4"=0°.

Fourth Example

As shown in FIG. 1, a piezoelectric transducer 110 is attached to an acousto-optic medium 100 formed of tellurium dioxide crystal, and a high-frequency circuit 130 is attached to the piezoelectric transducer 110 by copper wires 120. At this time, the acousto-optic medium 100 is processed to have two surfaces D'1 and D'2 opposing the piezoelectric transducer 110 as shown in FIG. 9. Further, the length of the side at which a surface H' opposing a surface G' contacts the surface D'i is set to L1, and the length of the side at which the surface H' contacts the surface D'2 is set to L2 different from L1, with 01=20° and 02=35°, as shown in FIG. 9. The high-frequency circuit 130 applies a high-frequency signal for frequency modulation to the acousto-optic transducer 110 via the copper wires 120. When incident light 150 is input to the acousto-optic modulator with a Bragg angle, diffracted light 151 and transmitted light 152 are emitted from the modulator. The diffracted light 151 is the frequency-modulated light of the incident light 150. The intensity stability of the resultant diffracted light 151 is significantly higher than in the case of FIG. 2 where only one surface opposes the piezoelectric transducer 110. Although in the fourth example, two surfaces oppose the piezoelectric transducer 110, the same advantage can be obtained if three or more surfaces are opposed to the piezoelectric transducer.

The above-described configurations and locations are merely examples, and other locations and configurations that provide the same advantage as the above may be employed. Further, the material of the acousto-optic medium 100 described above is also merely an example, and a different material, such as lead molybdate, exhibiting a similar acousto-optic effect can be used. Yet further, the sound absorbing material 210 is not limited to the silver paste, but may be a different material. It is sufficient if the material has the same acoustic impedance as the acousto-optic medium and a high ultrasonic wave attenuation factor. For instance, the material may be a silver paste mixed with iron powder.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acousto-optic modulator comprising:
   an acousto-optic medium having a configuration of a hexahedron, the acousto-optic medium having a first, second, third, fourth, fifth, and sixth surfaces (C, D, E, F, G and H); and
   a piezoelectric transducer provided on the first surface (C) of the acousto-optic medium, wherein
   the second surface (D) opposes the first surface (C) and has four respective sides shared by the third, fourth, fifth, and sixth surfaces (E, F, G and H),
   four angles defined, between the second surface (D) and the third, fourth, fifth, and sixth surfaces (E, F, G and H) are each other than ninety degrees,
   one of the third and fourth surfaces (E and F) serves as a light input surface, and the other one of the third and fourth surfaces (E and F) serves as a light output surface,
   one angle defined between each pair of the first, fifth, and sixth surfaces (C, G and H) is other than ninety degrees and the other angle is ninety degrees, the each pair has one shared side,
   the sixth surface (H) fails to serve as the light input surface and the light output surface, and
   the fifth surface (G) opposing the sixth surface (H) fails to serve as the light input surface and the light output surface.

2. The element according to claim 1, wherein
   the fifth surface (G) is coated with an ultrasonic wave absorbing material, a first angle defined between the first surface (C) and the fifth surface (G) being ninety degrees; and
   when a second angle defined between the first surface (C) and the sixth surface (H) opposing the fifth surface (G) is set to is set to $\varphi'+\pi/2$, a condition of $\varphi'\neq0$ is satisfied, $\varphi'$ is more than $-\pi/2$ and is less than $+\pi/2$.

3. The element according to claim 2, wherein
   when an angle defined between the fifth surface (G) and the second surface (D) is set to $\pi/2-\varphi$, a condition of $n\varphi'\neq\pi/2-2\varphi$ is satisfied, the n being an integer not less than 1.

4. The element according to claim 1, wherein
the fifth surface (G) is coated with an ultrasonic wave absorbing material, the fifth surface (G) being formed parallel to the sixth surface (H) opposing the fifth surface (G); and
when an angle defined between the first surface (C) and the sixth surface (H) is set to $\pi/2+\varphi''$, a condition of $\varphi''\neq 0$ is satisfied, $\varphi''$ is more than $-\pi/2$ and is less than $+\pi/2$.

5. The element according to claim 4, wherein
when an angle defined between the fifth surface (G) and the second surface (D) is set to $\pi/2-\varphi$, conditions of $\varphi''\neq|\pi/2-2\varphi|$ and $\varphi''\neq-\varphi$ are satisfied.

6. An acousto-optic modulator comprising:
an acousto-optic medium having a configuration of a hexahedron, the acousto-optic medium having a first, second, third, fourth, fifth, and sixth surfaces (C, D, E, F, G and H); and
a piezoelectric transducer provided on the first surface (C) of the acousto-optic medium, wherein
the second surface (D) opposes the first surface (C) and has four respective sides shared by the third, fourth, fifth, and sixth surfaces (E, F, G and H),
four angles defined between the second surface (D) and the third, fourth, fifth, and sixth surfaces (E, F, G and H) are each other than ninety degrees,
one of the third and fourth surfaces (E and F) serves as a light input surface, and the other one of the third and fourth surfaces (E and F) serves as a light output surface,
both of two angles defined between each pair of the first, fifth, and sixth surfaces (C, G and H) are other than ninety degrees, the each pair has one shared side, the sixth surface (H) fails to serve as the light input surface and the light output surface, and
the fifth surface (G) opposing the sixth surface (H) fails to serve as the light input surface and the light output surface.

7. The element according to claim 6, wherein
the fifth surface (G) is coated with an ultrasonic wave absorbing material, a first angle defined between the first surface (C) and the fifth surface (G) being ninety degrees; and
when a second angle defined between the first surface (C) and the sixth surface (H) opposing the fifth surface (G) is set to $\varphi'+\pi/2$, a condition of $\varphi'\neq 0$ is satisfied, $\varphi'$ is more than $-\pi/2$ and is less than $+\pi/2$.

8. The element according to claim 7, wherein
when an angle defined between the fifth surface (G) and the second surface (D) is set to $\pi/2-\varphi$, a condition of $n\varphi'\neq\pi/2-2\varphi$ is satisfied, the n being an integer not less than 1.

9. The element according to claim 6, wherein
the fifth surface (G) is coated with an ultrasonic wave absorbing material, the fifth surface (G) being formed parallel to the sixth surface (H) opposing the fifth surface (G); and
when an angle defined between the first surface (C) and the sixth surface (H) is set to $\pi/2+\varphi''$, a condition of $\varphi''\neq 0$ is satisfied, $\varphi''$ is more than $-\pi/2$ and is less than $+\pi/2$.

10. The element according to claim 9, wherein
when an angle defined between the fifth surface (G) and the second surface (D) is set to $\pi/2-\varphi$, conditions of $\varphi''\neq|\pi/2-2\varphi|$ and $\varphi''\neq-\varphi$ are satisfied.

* * * * *